United States Patent
Denoth

(10) Patent No.: US 12,504,094 B2
(45) Date of Patent: Dec. 23, 2025

(54) MAGNETIC NON-RETURN VALVE

(71) Applicant: liquitec AG, Kirchberg (CH)

(72) Inventor: Patrik Denoth, Kirchberg (CH)

(73) Assignee: Liquitec AG, Kirchberg (CH)

( * ) Notice: Subject to any disclaimer, the term of this patent is extended or adjusted under 35 U.S.C. 154(b) by 19 days.

(21) Appl. No.: 18/407,356

(22) Filed: Jan. 8, 2024

(65) Prior Publication Data

US 2024/0142018 A1  May 2, 2024

Related U.S. Application Data

(63) Continuation of application No. PCT/EP2022/069190, filed on Jul. 8, 2022.

(30) Foreign Application Priority Data

Jul. 8, 2021 (DE) .................. 20 2021 103 675.3

(51) Int. Cl.
*F16K 31/08* (2006.01)
*F16K 15/06* (2006.01)

(52) U.S. Cl.
CPC .......... *F16K 31/084* (2013.01); *F16K 15/06* (2013.01)

(58) Field of Classification Search
CPC .................... F16K 31/084; F16K 15/06
See application file for complete search history.

(56) References Cited

U.S. PATENT DOCUMENTS

| | | | | |
|---|---|---|---|---|
| 1,120,713 A | * | 12/1914 | Hennessey | F16K 15/06 137/515.3 |
| 1,593,519 A | * | 7/1926 | Underwood | F16K 15/06 137/515.5 |
| 2,667,895 A | * | 2/1954 | Pool | F16K 15/021 235/201 ME |

(Continued)

FOREIGN PATENT DOCUMENTS

| CN | 101871539 B | 9/2012 |
|---|---|---|
| CN | 110608304 A | 12/2019 |

(Continued)

OTHER PUBLICATIONS

International Search Report dated Oct. 20, 2022 in corresponding application PCT/EP2022069190.

*Primary Examiner* — Umashankar Venkatesan
(74) *Attorney, Agent, or Firm* — Muncy, Geissler, Olds & Lowe, P.C.

(57) ABSTRACT

A magnetic non-return valve having a valve body and a valve housing arrangement, wherein the valve body is guided so as to be axially displaceable in the valve housing arrangement and closes the fluid duct of the valve housing arrangement by way of a holding force acting counter to the direction of flow, wherein the axial holding force is generated by a repelling magnet arrangement, wherein a concentric piston connected to the valve body via the end face comprises a first magnet arrangement and the valve body guide comprises a second magnet arrangement, wherein the first magnet arrangement is arranged in a cavity of the piston and is enclosed so as to be media-tight on all sides, and the second magnet arrangement is arranged in a cavity of the valve body guide and is enclosed so as to be media-tight on all sides.

14 Claims, 2 Drawing Sheets

(56) References Cited

U.S. PATENT DOCUMENTS

| | | | | |
|---|---|---|---|---|
| 2,988,321 | A * | 6/1961 | Gilmont | F16K 27/0254 |
| | | | | 422/417 |
| 4,574,833 | A * | 3/1986 | Custer | F16K 17/28 |
| | | | | 137/460 |
| 4,874,012 | A * | 10/1989 | Velie | F16K 17/34 |
| | | | | 137/557 |
| 5,320,136 | A * | 6/1994 | Morris | F16K 15/021 |
| | | | | 137/516.29 |
| 7,533,692 | B2 * | 5/2009 | Walpole | F16K 15/08 |
| | | | | 137/533.27 |
| 7,553,006 | B2 * | 6/2009 | Busch | B41J 2/17596 |
| | | | | 251/65 |
| 9,145,888 | B2 * | 9/2015 | Hoshino | F16K 31/084 |
| 11,098,817 | B1 * | 8/2021 | Eddleman | F16K 47/01 |
| 11,435,008 | B2 * | 9/2022 | Butland | F16K 15/08 |
| 2006/0290758 | A1 | 12/2006 | Busch et al. | |
| 2008/0265189 | A1 * | 10/2008 | Bravo | F16K 31/086 |
| | | | | 251/63.5 |
| 2013/0052497 | A1 * | 2/2013 | Noh | H01M 50/308 |
| | | | | 429/82 |

FOREIGN PATENT DOCUMENTS

| | | | | |
|---|---|---|---|---|
| JP | H03213777 A | | 9/1991 | |
| WO | WO-2015019128 A1 * | | 2/2015 | F16K 37/0033 |

* cited by examiner

MAGNETIC NON-RETURN VALVE

This nonprovisional application is a continuation of International Application No. PCT/EP2022/069190, which was filed on Jul. 8, 2022, and which claims priority to German Patent Application No. 20 2021 103 675.3, which was filed in Germany on Jul. 8, 2021, and which are both herein incorporated by reference.

BACKGROUND OF THE INVENTION

Field of the Invention

The present invention relates generally to a magnetic non-return valve, in particular for use in a sterile environment.

Description of the Background Art

Non-return valves are used to allow a fluid flow in only one direction. If a pressure in the other direction becomes greater than the closing force, the fluid opens the valve. Designs are generally known in which a valve body closes a fluid duct counter to the direction of flow, the closing force of the valve body being applied via a helical spring. One variant is a substitution of the spring by a repelling magnet arrangement, as a result of which contaminations in the valve arrangement can be reduced.

The field of application for non-return valves is very diverse. In process technology and in particular in sterile technology, it is necessary that no deposits can be formed in the valve due to cavities, gaps or seal rings. Friction between the individual components can also lead to abrasion. Such contaminations should be avoided as far as possible in a largely sterile production, e.g., of pharmaceutical products or foodstuffs.

In the field of bathroom fittings, CN 101871539 B discloses magnetic non-return valves, in which a first magnet is located on the valve body and a second magnet on the valve body guide, the two annular exposed magnets repelling each other, as a result of which the valve body blocks the fluid duct counter to the direction of flow. The valve seals against the fluid via an exposed radial seal ring arranged on the valve body.

JPH03213777A also discloses a magnetic non-return valve for sanitary installations, in which two repelling magnets sealingly press a valve body against a fluid duct. In this context, the guide pin of the valve body plunges into a blind hole in the valve body guide and thus forms a cavity therewith. The magnets are here arranged in such a way that the respective end faces repel one another. Identical to CN 101871539 B, the valve body seals via an exposed seal ring located on the valve body.

Known magnetic non-return valves with repelling polarity have mainly been found in the sanitary sector thus far. These valves prove to be disadvantageous in an aseptic environment since the exposed magnet arrangement and the seal rings form inaccessible cavities in which residues of cleaning agents or product residues can accumulate. The cleaning and sterilization is often carried out by means of CIP and SIP methods at temperatures of up to 140° C., as a result of which common magnet types (type N) lose their magnetic effect. Furthermore, abrasion is promoted due to a lack of a mounting support for the valve body in the valve guide housing.

SUMMARY OF THE INVENTION

It is therefore an object of the present invention to provide a magnetic non-return valve having a repelling magnet arrangement for use in an aseptic environment in which the above mentioned disadvantages are at least partially eliminated.

This object is achieved by the present invention. According to a first aspect, the present invention provides a magnetic non-return valve having a valve body and a valve housing arrangement, the valve body being guided so as to be axially displaceable in the valve housing arrangement and closing the fluid duct of the valve housing arrangement by way of a holding force acting counter to the direction of flow, the axial holding force being generated by a repelling magnet arrangement, a concentric piston connected to the valve body via the end face comprising a first magnet arrangement and the valve body guide comprising a second magnet arrangement, wherein the first magnet arrangement is arranged in a cavity of the piston and is enclosed so as to be media-tight on all sides, and the second magnet arrangement is arranged in a cavity of the valve body guide and is enclosed so as to be media-tight on all sides.

Further scope of applicability of the present invention will become apparent from the detailed description given hereinafter. However, it should be understood that the detailed description and specific examples, while indicating preferred embodiments of the invention, are given by way of illustration only, since various changes. combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
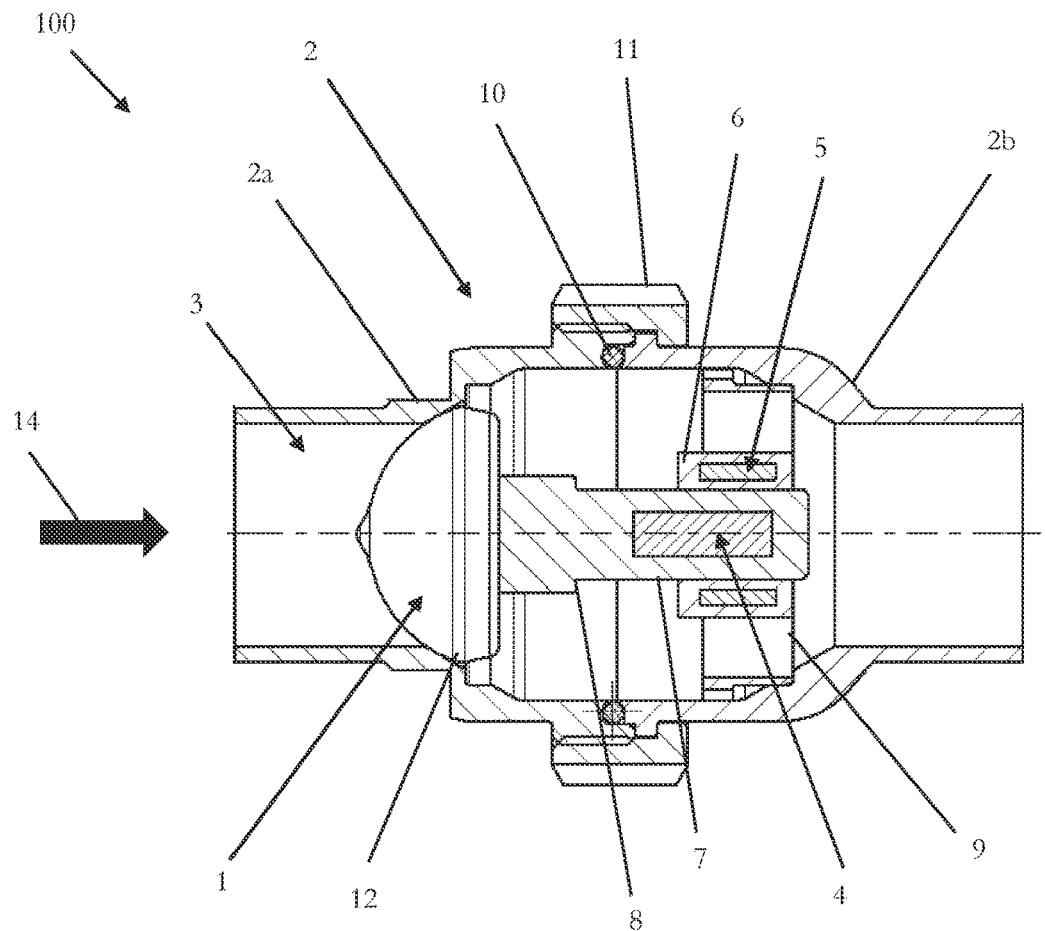
FIG. 1 shows a sectional view of an example of a magnetic non-return valve according to the invention.

FIG. 1 shows a magnetic non-return valve according to the invention. General explanations on the embodiments are initially provided, followed by a detailed description.

There are examples in which a first magnet arrangement comprises a rod-shaped magnet arrangement through which the central axis passes. The magnet arrangement here comprises at least one magnet. The rod-shaped magnet can have a round cross-sectional geometry. The polarity of the magnet arrangement is here divided transversely to the axis of rotation. The locking force of the valve is set via the strength of the magnetic field. According to the required holding force, the magnet is selected before the assembly. According to a uniform force distribution, the first magnet arrangement is aligned along the axis of rotation of the valve.

There are examples in which the second magnet arrangement comprises an annular magnet arrangement that is aligned so as to be concentric with the piston. The magnet arrangement here comprises at least one magnet which is aligned so as to be concentric with the first magnet arrangement. The second magnet arrangement can comprise an annular one-part magnet or multiple rod magnets which have the same polarity and are arranged radially around the axis of rotation, the polarity of the magnet arrangement being divided transversely to the axis of rotation.

There are examples in which the first magnet arrangement partially passes through the second magnet arrangement. The first and second magnet arrangements are here polarized with regard to one another in such a way that the end faces of the first and second magnet arrangements repel one another. Due to the closed magnetic field lines, the combination of rod magnet and ring magnet creates, along with the force having an axial effect, also a force having a radial effect. Since the second magnet arrangement is fixed and the first magnet arrangement is mounted so as to be axially displaceable, the result is a radial mounting of the first magnet arrangement which additionally minimizes the friction of the valve body, as a result of which abrasion is reduced.

There are examples in which the first magnet arrangement is enclosed by the cavity of the piston in an integrally bonded fashion. Due to the complete encapsulation, no residues or deposits should be formed on the piston. For a clean valve run, it is advantageous for the external geometry of the piston to be as free as possible from notches or unevenness. Closing the multi-part piston housing after the insertion of the magnet arrangement can be carried out by means of TIG, MIG/MAG or laser welding. A low heat input into the magnet arrangement is here advantageous since magnets lose their magnetic properties when the thermal load is excessively high. Here, laser welding is distinguished by a high welding speed and a low thermal input, as a result of which the magnetization is preserved.

There are examples in which the second magnet arrangement is enclosed by the cavity of the valve body guide in integral fashion. In order to minimize unevenness and maintain the magnetic properties, the components of the valve body guide are preferably joined by laser welding, the second magnet arrangement being inserted into the valve body guide cavity provided for this purpose before joining. The geometry of the valve body guide is annular so that no cavities are formed, if possible.

There are examples in which at least the valve body guide is made of stainless steel. In order to avoid corrosion, austenitic stainless steel is preferably used. The material 1.4435 is here resistant to all forms of corrosion and can therefore be used in a sterile production environment, such as medical technology, pharmaceutical industry or food processing.

There are examples in which the piston has a shoulder to limit the immersion depth of the valve body. In the event of overstressing, the first magnet arrangement can be "immerged" too far into the second magnet arrangement. As a result, the magnetic field acting in the longitudinal direction counter to the fluid flow can be reversed, as a result of which the valve remains permanently open. In order to avoid this effect, the piston is provided with shoulders which can be made as a turned-off step.

There are examples in which the first magnet arrangement and/or the second magnet arrangement comprises magnets that are resistant to high temperatures. For the purpose of sterilization, the non-return valves are autoclaved at temperatures of up to 140° C. Common type N magnets, such as N52 neodymium magnets (NdFeB), already lose magnetization permanently at a temperature of 65° C., as a result of which the preset holding force of the valves is changed and the non-return valve becomes unusable. Therefore, high-temperature magnets having an operating temperature of at least 140° C. (e.g. type SH, UH, EH, AH, Y) are used.

There are examples in which the closing force of the valve body is adjusted via the magnet strength. In order not to influence the magnetic field, all components of the non-return valve, if possible,—apart from the magnet arrangements—should be made from a non-magnetic material. The individual components are preferably made from an identical material in order to avoid contact corrosion. The magnet arrangements are preferably designed as permanent magnets. Due to the selection of the magnet before the assembly, the holding force of the valve body can be preset according to the customer requirements.

There are examples in which the valve body guide is connected via a cage located inside the valve housing arrangement. According to a reduced maintenance effort and easier cleaning, the cage can be connected to the valve guide housing in a force-locking or form-fitting manner.

There are examples in which the valve housing arrangement is radially separable and is sealingly connected via at least one radial seal ring. The mutually facing end faces of the valve housing arrangement have a circumferential groove corresponding to the cross-section of the radial seal ring. The radial seal ring can be designed as an O-ring, flat or profiled seal ring. Depending on the requirement profile, the seal ring can be made of the materials EPDM, silicone, FEP silicone, FKM, FFKM or as a PTFE-based composite material (Gylon®, Tuf-Steel®).

There are examples in which the valve housing arrangement is divided into two parts, comprising a valve body housing and a valve guide housing, the connection being made in a force-locking manner by means of a retaining screw connection. This allows the non-return valve to be mounted without special tools or be disassembled into its individual parts for cleaning or maintenance. The valve body housing or the valve guide housing comprises an external thread in the cylindrical area of the mutually facing end faces. The housing part without an external thread comprises a step on the outside, both housing halves being bolted together by means of a retainer nut.

There are examples in which the valve seat surface of the valve body is made from PTFE. Depending on the requirements, the valve body can here be designed as a diaphragm or ball variant. In the ball variant, the valve body can have a partial PTFE coating in the area of the valve seat or be completely made of PTFE so as to avoid intermediate spaces in which residues can be formed.

FIG. 1 shows a sectional view of a magnetic non-return valve 100 having a valve body 1 that is concentrically connected to a piston 7 via the end face. The piston 7 is axially displaceable, is positioned concentrically along the longitudinal direction of the valve in a valve body guide 6 and passes completely through the valve body guide 6. The piston 7 comprises a rod-shaped first magnet arrangement 4 in a cavity provided for this purpose, the first magnet arrangement being enclosed on all sides by the piston 7. The valve body guide 6 is statically connected to the valve guide housing 2b via a cage 9 in a force-lockingly and/or formfittingly detachable manner. The valve body guide 6 comprises a cavity in which an annular second magnet arrangement 5 is enclosed on all sides. The polarity of the first and second magnet arrangements 4, 5 is arranged in opposite directions, as a result of which the valve seat surface 12 of the valve body 1 is pressed counter to the direction of flow 14 into the tapered area of the valve body housing 2a. As a result, the fluid duct 3 remains closed counter to the direction of flow 14 until a pressure of the fluid can overcome the restoring force of the repelling magnet arrangement 4, 5. The immersion depth of the valve body 1 is here limited by a shoulder 8 in the form of a step on the piston 7. The valve body housing 2a is coupled to the valve guide housing 2b via a retainer nut 11. A radial seal ring 10 is inserted between the contact surfaces of the valve body housing 2a and the valve guide housing 2b, both housing halves 2a, 2b having a circumferential groove which together form a cross-section for receiving the radial seal ring 10.

Figures 2, 2A:
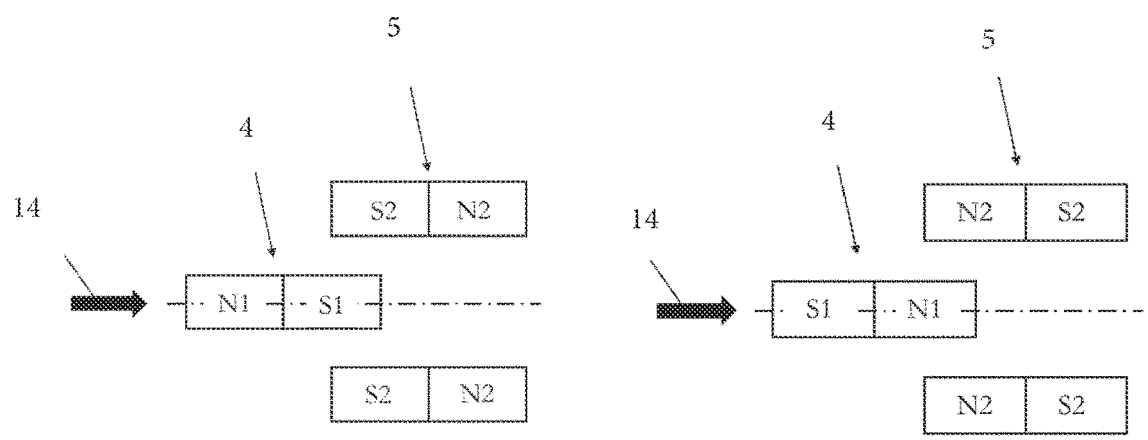
FIG. 2 shows an example of a schematic magnet arrangement.
FIG. 2A shows an example of the magnet arrangement.

FIG. 2 and FIG. 2A show schematic representations of the first and second magnet arrangements 4, 5 in the installed state in relation to one another. The first and second magnet arrangements are magnetized axially through the magnet height axis. FIG. 2 shows a first example in which the force acting counter to the direction of flow 14 is generated via the south pole S1 of the first magnet arrangement 4 and S2 of the second magnet arrangement 5.

FIG. 2A shows a second example of the orientation of the magnet arrangements 4, 5 in which the acting force is generated via the north pole N1 of the first magnet arrangement 4 and N2 of the second magnet arrangement 5.

Figure 3:
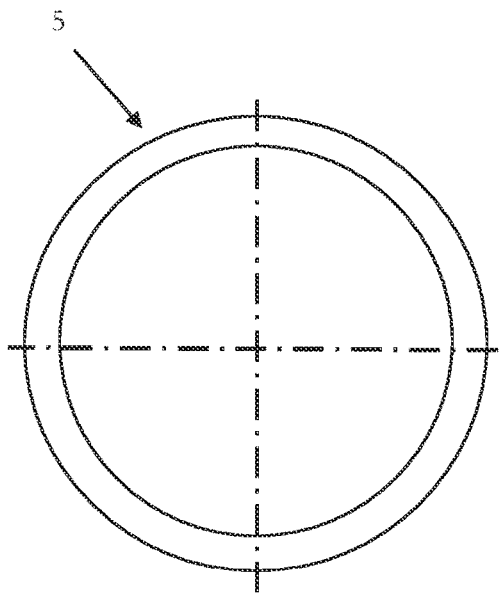
FIG. 3 shows an example of a second magnet arrangement.
Figure 3A:
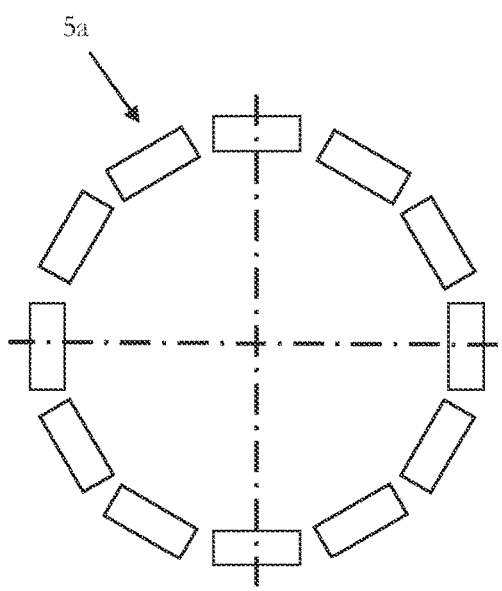
FIG. 3A shows an example of the second magnet arrangement.

FIG. 3 and FIG. 3A show examples of the second magnet arrangement, a first example in FIG. 3 comprising an annular one-part magnet arrangement.

FIG. 3A shows a second example of the second magnet arrangement 5, a plurality of rod magnets 5A being arranged radially around the axis of rotation. The longitudinal axes of all rod magnets 5A are here arranged parallel to the axis of rotation, the rod magnets 5A being magnetized axially through the magnet height axis.

Figure 4:
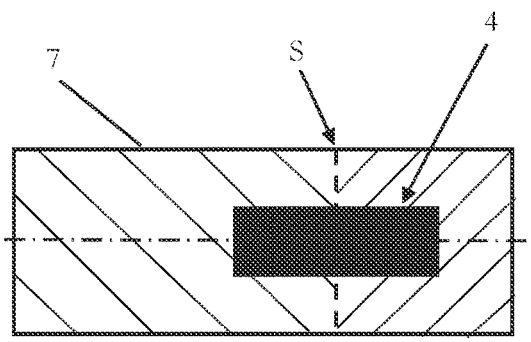
FIG. 4 shows an example of the enclosure of a first magnet arrangement on all sides by a piston.

FIG. 4, FIG. 4A, FIG. 4B and FIG. 4C show schematic representations of four examples of the enclosure of the first magnet arrangement 4 on all sides by the piston 7. Here, the examples differ with regard to the integrally bonded individual parts of the piston. In FIG. 4, the housing of the piston 7 is radially divided in the area of the first magnet arrangement 4. Due to this arrangement, both housing parts of the piston 7 automatically align themselves concentrically via the first magnet arrangement 4, the two housing parts of the piston 7 being connected to each other via a weld seam S.

Figure 4A:
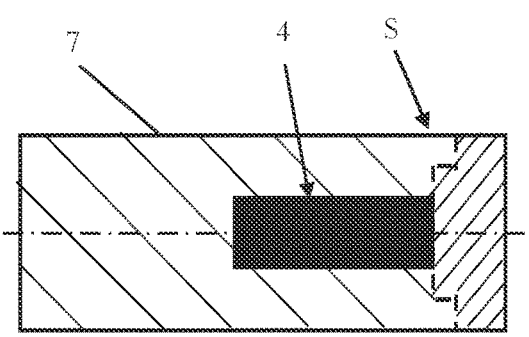
FIG. 4A shows an example of the enclosure of the first magnet arrangement on all sides by the piston.

FIG. 4A shows a second example in which the piston 7 is radially divided in the area of the end face of the magnet arrangement 4 and forms a common plane, the separating plane of the two housing parts of the piston 7 having a step. As a result, both housing parts of the piston 7 can be aligned with each other, and the heat input into the magnet arrangement 4 is reduced when the weld seam S is produced.

Figure 4B:
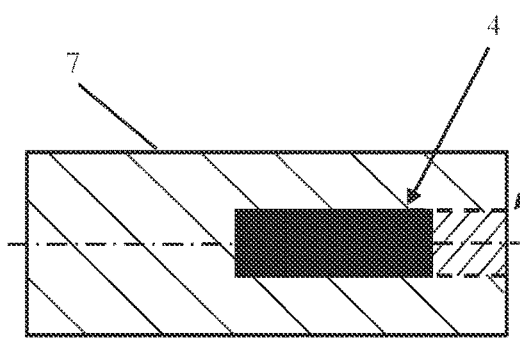
FIG. 4B shows an example of the enclosure of the first magnet arrangement on all sides by the piston.

FIG. 4B shows a third example in which the end face of the piston 7 facing away from the valve body has a blind hole for inserting the magnet arrangement 4, the bore being closed via a cylindrical or conical closure on the end face by means of a radial weld seam S.

Figure 4C:
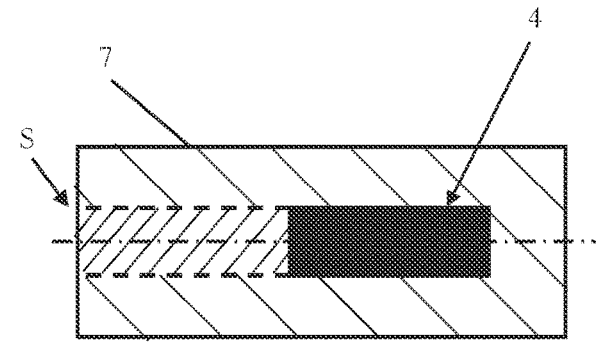
FIG. 4C shows an example of the enclosure of the first magnet arrangement on all sides by the piston.

FIG. 4C shows a fourth example in which the end face of the piston 7 facing the valve body 1 has a blind hole for the insertion of the magnet arrangement 4, the bore being closed with a radial weld seam S via a cylindrical closure piece on the end face. Due to this arrangement, the weld seam S is as far away as possible from the magnet arrangement 4, as a result of which the heat input is further reduced. In addition, the weld seam S is covered by the valve body 1 in this arrangement.

Further examples, embodiments and variations of the present invention are obvious to a person skilled in the art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetic non-return valve comprising:
   a valve body;
   a valve housing arrangement, the valve body being guided so as to be axially displaceable in the valve housing arrangement and closing a fluid duct of the valve housing arrangement via an axial holding force acting counter to a direction of flow, the axial holding force being generated by a repelling magnet arrangement;
   a concentric piston being connected to the valve body via an end face, the concentric piston comprising a first magnet arrangement; and
   a valve body guide comprising a second magnet arrangement,
   wherein the first magnet arrangement is arranged in a cavity of the piston and is enclosed so as to be media-tight on all sides,
   wherein the second magnet arrangement is arranged in a cavity of the valve body guide and is enclosed so as to be media-tight on all sides, and
   wherein the first magnet arrangement partially passes through the second magnet arrangement.

2. The non-return valve according to claim 1, wherein the first magnet arrangement comprises a rod-shaped magnet arrangement through which a central axis passes.

3. The non-return valve according to claim 1, wherein the second magnet arrangement comprises an annular magnet arrangement that is concentrically aligned with the piston.

4. The non-return valve according to claim 1, wherein the first magnet arrangement is enclosed in an integrally bonded manner by the cavity of the piston.

5. The non-return valve according to claim 1, wherein the second magnet arrangement is enclosed in an integrally bonded manner by the cavity of the valve body guide.

6. The non-return valve according to claim 1, wherein at least the valve body guide is made of stainless steel.

7. The non-return valve according to claim 1, wherein the piston has a shoulder to limit an immersion depth of the valve body.

8. The non-return valve according to claim 1, wherein at least the first magnet arrangement and/or the second magnet arrangement comprises magnets that are resistant to high temperatures.

9. The non-return valve according to claim 1, wherein a closing force of the valve body is adjusted via a magnet strength.

10. The non-return valve according to claim 1, wherein the valve body guide is connected via a cage located inside the valve housing arrangement.

11. The non-return valve according to claim 1, wherein the valve housing arrangement is radially separable and is sealingly connected via a radial seal ring.

12. The non-return valve according to claim 1, wherein the valve housing arrangement is divided into two parts, comprising a valve body housing and a valve guide housing, a connection being made in a force-locking manner via a retaining screw connection.

13. The non-return valve according to claim 1, wherein at least a valve seat surface of the valve body is made of PTFE.

14. The non-return valve according to claim 1, wherein the end face comprises a blind hold for inserting the first magnet arrangement.

* * * * *